Nov. 29, 1955 — H. P. ZARTLER — 2,724,885
QUICK RELEASE HOSE CLAMP
Filed March 26, 1954 — 2 Sheets-Sheet 1
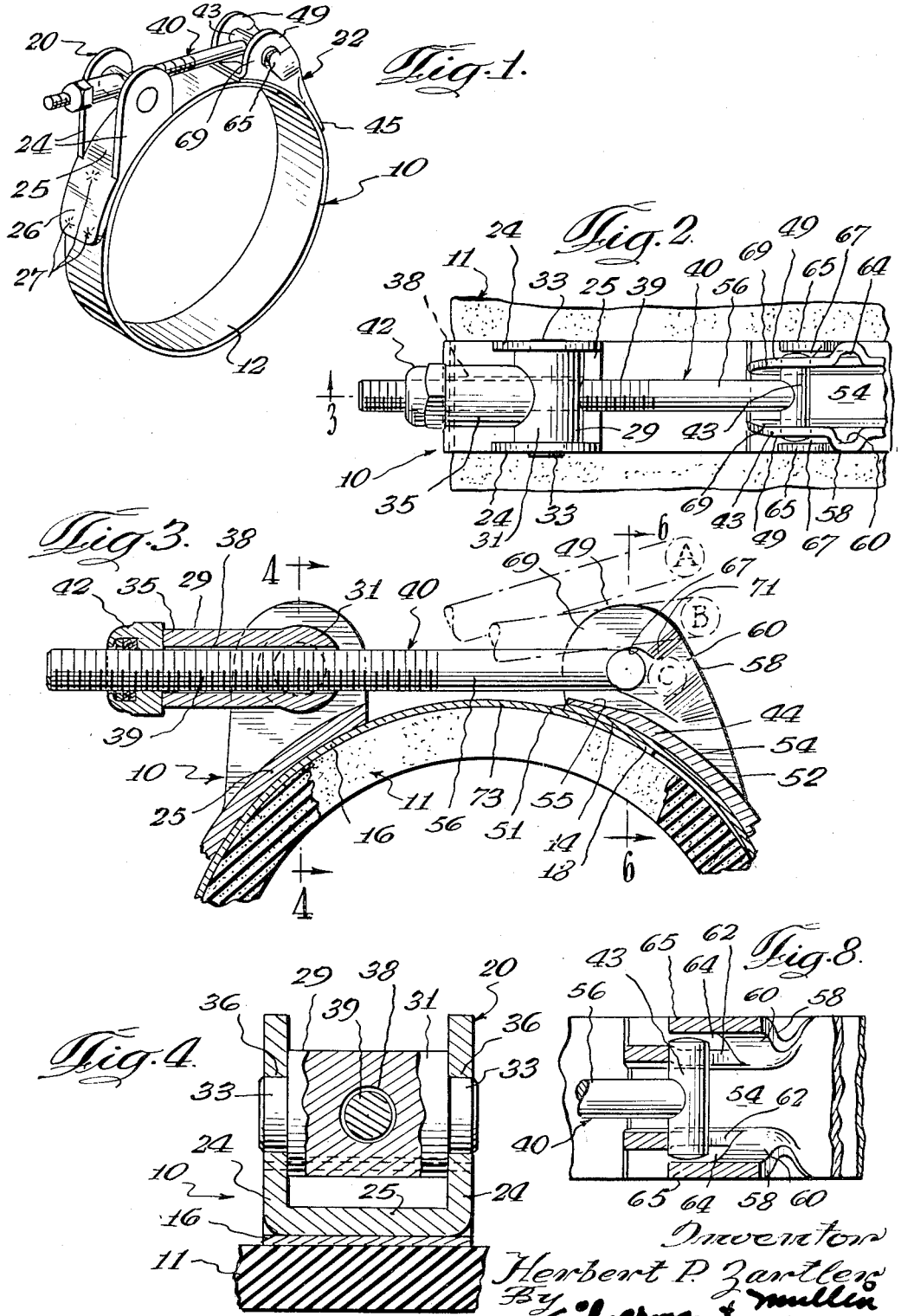

Nov. 29, 1955     H. P. ZARTLER     2,724,885
QUICK RELEASE HOSE CLAMP
Filed March 26, 1954     2 Sheets-Sheet 2
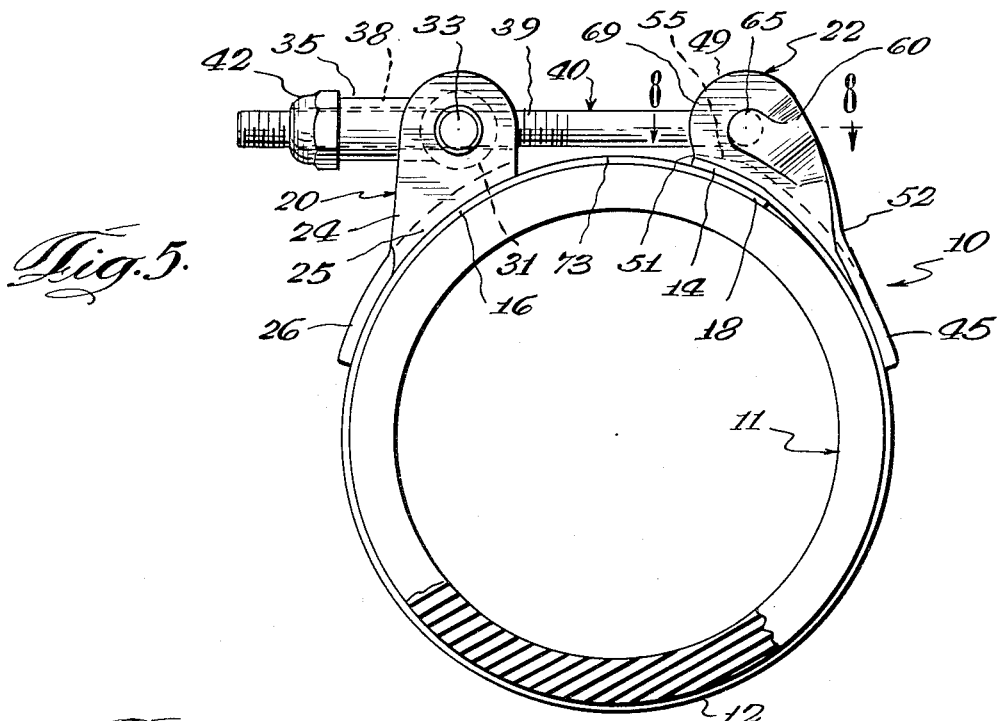
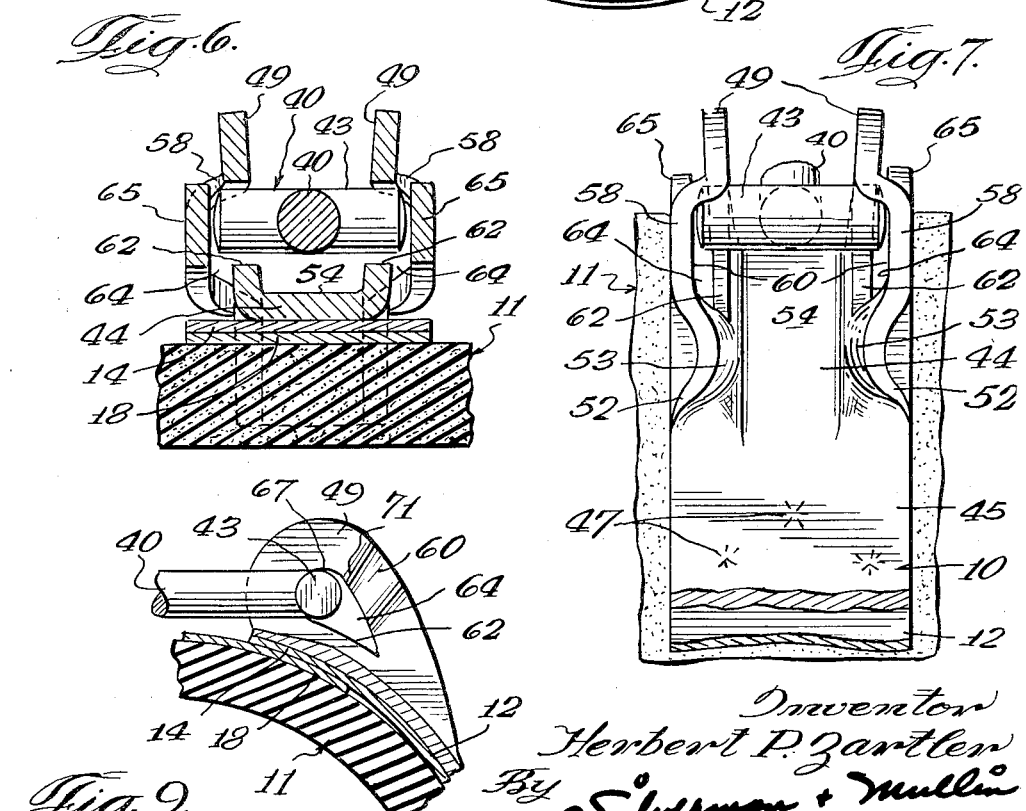
Inventor
Herbert P. Zartler
By Silverman + Mullin
Attorneys

United States Patent Office 2,724,885
Patented Nov. 29, 1955

2,724,885
QUICK RELEASE HOSE CLAMP

Herbert P. Zartler, Chicago, Ill., assignor to Wittek Manufacturing Company, Chicago, Ill., a corporation of Illinois Application March 26, 1954, Serial No. 419,000

10 Claims. (Cl. 24—279)

This invention relates generally to quick release hose clamps and more particularly is concerned with a hose clamp of unusual strength and simplicity and with novel means for causing engagement between the ends of the hose clamp.

An important object of the invention is to provide a hose clamp of the quick release type in which there is a pair of parallel spaced ears provided on one free end of the hose clamp the planes of which are perpendicular to the axis of the hose clamp, and the T end of a T-bolt journalled on the other free end of the hose clamp is engaged in said ears, whereby the tension force tending to separate the ends of the hose clamp will be in the planes of said ears.

Still a further object of the invention is to provide a hose clamp of the quick release type in which there is a T bolt journalled on one free end of the hose clamp and the other free end is provided with a novel seat for the T, the entrance to which is such that in order to release the T, it must first be moved parallel with the tension member or band and then generally radially outward; and in order to cause engagement of the T, the reverse procedure is followed.

Still a further object of the invention is to provide a quick acting hose clamp in which the free ends of the clamp are locked together when the clamp is engaged about a hose in a manner different from and more efficient than hose clamps heretofore used.

A further important object lies in providing a clamp of the quick release character in which, notwithstanding the fact that the same is possessed of great tension strength, nevertheless the parts are of relatively thin gauge metal stampings of simple formation.

A further object of the invention lies in the provision of a hose clamp of the quick release type in which there is provided a T bolt journalled to one free end of the clamp in a novel manner.

Still another object of the invention lies in the provision of a structure in which the free ends of the hose clamp are provided with formations having elongate tails or extensions overlying the tension band so that said formations which support and engage the coupling means between the ends, are secured to the said tension band remote from the said free ends.

Many other objects will become apparent as the description of the invention proceeds, in connection therewith there is illustrated a preferred hose clamp construction embodying the invention. The details of this structure are illustrated in the drawings and set forth with some particularity but only by way of example and not limitation, since it will immediately be apparent that considerable variation is possible without departing from the spirit or scope of the invention.

In the drawings in which like characters designate the same parts throughout the several figures:

Fig. 1 is a perspective view of a quick release hose clamp embodying the invention, the same being in connected condition and not associated with a hose or conduit.

Fig. 2 is a top plan view of the clamp of Fig. 1, a fragment of a hose being illustrated to show the manner of association of the hose clamp therewith.

Fig. 3 is a sectional view through the hose clamp along the line 3—3 of Fig. 2 and in the indicated direction.

Fig. 4 is a sectional view through the trunnion or journal of the T-bolt along the line 4—4 of Fig. 3 and in the indicated direction.

Fig. 5 is a side elevational view of the hose clamp taken looking in the direction of the axis thereof.

Fig. 6 is a sectional view taken generally through the hose clamp along the line 6—6 of Fig. 3 and in the indicated direction.

Fig. 7 is a fragmentary end on view of the hose clamp taken generally from the right hand side of Fig. 5 and looking into the entrance of the passageway which receives the T-bolt.

Fig. 8 is a sectional view taken generally along the line 8—8 of Fig. 5 and in the indicated direction.

Fig. 9 is a fragmentary view similar to the right hand portion of Fig. 3, but illustrating a modified form of the invention.

Generally the invention is exemplified in a hose clamp having a tension band adapted to be constricted about a hose or conduit, and having two free ends which may pass inside one another in conventional design. One free end has a journal thereon comprising a pair of ears engaging the reduced diameter ends of a hollow trunnion through which extends the straight end of a T-bolt. The other end of the T-bolt, having the T formation extends over the intervening space between the journal and the other free end of the tension band to a stamping formed with a pair of ears in planes perpendicular to the axis of the clamp. The T portion of the bolt is seated in recesses formed in said ears, the spacing between ears being substantially less than the length of the T so as to prevent the T from being pulled out from between said ears. Toward the back of the ears they are provided with grooves or channels so as to provide a passageway whose width is greater than the length of the T, the passageway extending generally in a radial direction.

In order to move the T into its seated position it is necessary to start at the back of the ears, pressing the free ends of the tension band together against their normally outward bias, tilting the T-bolt so that the T end passes over and behind the ears. Thereafter the T is led into the passageway inwardly in a generally radial direction, and then parallel to the band into the seat. In moving from the passageway into the seat the T end passes from a position where the clamp must be constricted more than it is when the final seated condition is achieved, thereby causing the resilience of the clamp to snap same into its finally locked condition. Considering the axis of the T-bolt trunnion, the T end must rotate about said trunnion, during the seating movement, and because of the portion of the movement parallel to the tension band, just prior to entering its seated condition, the T of the bolt is closest to the axis of the hose clamp. The seating is thus achieved only by pressing the T inward and moving it into its seat and releasing the same whereupon it will snap into seated condition.

Because of the described coupling or connection, merely compressing the clamp and moving the T-bolt in the direction of its axis away from the trunnion, that is to say, squeezing the free ends toward one another, will not release the T from its seat. It is required that the T of the bolt be moved radially inward and into the passageway to permit its removal. This will become apparent with the detailed description of the preferred embodiment immediately below.

The reference character 10 is the hose clamp generally and 11 is a hose or conduit having the clamp secured thereto. The hose clamp 10 is formed of a strip of metal in circular formation arranged to open to maximum diameter by virtue of resilience provided during manufacture. In other words, it is preferred that the circle formed by the band be much larger in diameter than that shown in Fig. 5, for example, so that there is always some outward spring on the strip. The strip will be termed the tension band 12, and same has two free ends 14 and 16. Actually, the so-called free end 16 is spaced from the physical end 18 of the band 12 which in use is tucked under the free end 14 to prevent pinching of the hose. Where "free ends" are referred to, the functional free ends 16 and 14 will be intended, and the end 18 will be termed the bridging end. That portion of the band 12 from the bridging end 18 to the so-called free end 16 is subjected to practically no stress and hence functions only as a bridge.

To the free end 16 there is secured a formation or mounting designated generally 20 for pivotally mounting the T-bolt which will be described in detail below. A second formation designated 22 is secured to the free end 14 for engaging with the T end of the T-bolt and coupling the free ends together. It will be noted that the formation 20 is an integral, preferably stamped member having a pair of side walls or ears arranged in spaced apart planes generally coincident with the planes of the edges of the tension band 12. The side walls 24, as they will be termed to distinguish same from the ears of the formation 22, are integrally connected with an elongate arcuate base 25, which, together with its tail or extension 26 closely conform in curvature to the outer surface of the band 12 at the end 16. The extension 26 is welded to the band 12 in several places 27, the resulting joint being of sufficient strength to withstand great tension forces without fracture and without the necessity of welding the base to the band 12 immediately adjacent the side walls 24.

Between the side walls 24 there is mounted a T-shaped trunnion member and guide 29. The trunnion member 29 has a short crosshead or stub shaft portion 31 provided at its opposite ends with reduced diameter bearing parts 33, and an elongate stem 35 secured to the stub shaft portion 31 at the center thereof. The bearing parts 33 are journalled in suitable openings 36 properly aligned in the opposite side walls to enable pivotal movement of the trunnion member 29. A recess 38 is provided throughout the length of the stem 35 and extending completely through the cross head or stub shaft portion, of a diameter to slidably accommodate the threaded shank 39 of the T-bolt 40.

When the T-bolt is in position, its shank extends through the recess 38, and a suitable lock-nut 42 is engaged over its free end and against the end of the stem 35. Any appropriate locking means may be used, there is illustrated a simple fibre insert nut of well-known construction.

The T 43 of the bolt 40 is intended to be engaged with the formation 22 in such a manner as to be easily installed or removed, but nevertheless not capable of readily being accidentally disassociated therefrom. The formation 22 also has a base portion 44, like the base 25 of the mounting 20, which, together with an extension 45 closely conforms in curvature to, overlies, and is welded to the free end 14 of the band 12, at spots 47. The formation 22 includes a pair of parallel upstanding ears 49 which are spaced apart a distance somewhat less than the length of the T 43 of the bolt 40, and the planes of which are substantially parallel and perpendicular to the axis of the hose clamp 10.

At this point it is desired to indicate that where the axis of the clamp 10 is referred to, the location is intended as the geometric center of the circle defined by the band 12 when secured to a hose such as 11, and such axis obviously will coincide with the axis of the hose at the location of the hose clamp.

The characterization of the planes of the ears 49 as parallel is advisedly made notwithstanding the drawing shows a slight divergence outward thereof. This is of no material importance and may be required for ease of fabrication.

In side elevational contour, the ears commence at the point 51 and extend in a circular formation toward the extension 45 where the contour tapers as indicated at 52. The tapered portions 52 blend with the base 44 because they are integrally formed with the base, being the beginning of the bend 53 which is deformed from the base 44 to provide the upstanding ears. As previously explained, the ears 49 are spaced apart less than the length of the T 43. There is provided a strip 54 of the base 44 which is retained flat and in engagement with the free end 14 of the band 12. The forward end of the strip 54 may be beveled at 55 to provide clearance for the unthreaded portion 56 of the shank of the T-bolt 40.

Intermediate the ends 51 and 52 of the ears 49 they are substantially bowed outward as at 58, preferably to the width of the tension band 12, and at least sufficiently spaced apart on the interior thereof to permit passage of the T 43 of the T-bolt 40. The deformations 58, 58 extend uniformly transverse of the ears 49, in a generally radial direction to provide a pair of facing grooves 60. The direction of these grooves is generally from the upper right to the lower left as the clamp 10 is disposed as shown in Figs. 3 and 5.

The facing grooves 60 may be said to form a generally radially extending passageway from the outer edges of the ears 49 inwardly to just above the base 44. The lower ends of the grooves 60 terminate at the tracks 62 formed by reason of the deformations being sheared away from the walls of the ears at this point. Thus the tracks 62 are spaced above the strip 54 and are spaced apart a distance corresponding to the distance between the parallel ears 49 other than at the deformations 58.

The sheared away portion of the walls of the ears 49 provide a pair of opposed openings which are enlarged at their forward end by punching a generally circular lug 65 outwardly of each side wall, the said lug being a continuation of the deformation 58 of each ear 49. The resulting circular portions 67 of the openings 64 are of such shape and dimensions as to accommodate the ends of the T 43. Since the distance between the ears 49 is less than the length of the T 43, when the T is seated in the openings 64, the front imperforate curved portions 69 will engage beneath the T 43. This presents an edge-on contact between the T and the ear 49, and when tension is applied, the forces tending to deform the formation 22 would have to crush the material in the curved portions 69. In addition the connected portion which extends over the top of the T to the tapered back end 52 is resistant to tension forces, being directly connected with the extension 45.

Because of the structure described above, the hose clamp 10 may be formed of relatively thin gauge metal and still withstand enormous stresses without failure.

The method of securing or releasing the T 43 in the formation is dependent upon the passageway formed by the grooves 60 and the resilience of the tension band. It will be seen in Fig. 3 that in addition to the solid line position of the T 43, three broken line positions are shown, designated A, B and C. Presuming that it is desired to quickly assemble the T 43 into the formation 22, first the T-bolt 40 is pivoted on the bearings 33 from the position A to the position B. In view of the inherent resilience of the band 12, it will be necessary to compress the band manually, even to assume the position A, and even more so to move the T from A to B. Just at B, the T is poised to enter the passageway defined by the grooves 60. It is manually introduced into said passageway, and the tension holding the band 12 manually may now be released, since the outward movement of the free ends will tend to force the T down the passageway defined by grooves 60 to the bottom of the same, approaching the tracks 62. Now, it will be seen that the T assumes the position C just before leaving the passageway to enter the openings 67 and it must clear the corner 71 defined by the juncture of the curved portions 69 and the deformations 58. To pass this corner, the T 43 must move downward, after which it can move to the left and upward. This described movement can be accomplished in the event the bias of the band 12 is such as to exert sufficient pull outward to enable the T to move from the position C down and around the corner up to the full line position of Fig. 3. In the event the spring of the band is insufficient, this movement can be accomplished by simply pulling the free ends outward manually. In either event, the T snaps into position in the openings 67 and is seated against the curved portions 69 of the ears 49.

The position of the T which is shown in full lines in Fig. 3 is one which cannot be easily disturbed because, merely pushing the free ends 14 and 16 together, that is along a line parallel to the axis of the T-bolt 40 causes the T to come into engagement with the back of the shoulder or corner 71. Sufficient pressure of course will cause the T 43 to ride around the corner, and into the passageway and out of the formation 22. But this is impractical, and it is easier to manually push the bolt 40 downward as viewed in Fig. 3 and to the right to align the T 43 with the passageway.

It will be seen that while it is a simple matter quickly to join or separate the free ends of the hose clamp 10 it is practically impossible to shake the ends loose, or apply ordinary constricting pressure to the ends to cause same to separate. The T 43 is thus substantially locked in position.

The tracks 62 guide the movements of the T 43 and prevent undue friction between the T and the base 44 at any time during installation or removal of the clamp. Obviously, the tracks define the spacing of the T 43 above the strip 54 to assure reasonable clearance between the shank of the T-bolt 40 and the bridging portion 73 between free end 16 and the bridging end 18.

The lugs 65 protect the ends of the T 43 and center the same between the ears 49, 49. The lugs may be eliminated in which case the ears have the appearance of the modified form shown in Fig. 9. Here the opening 64 and its extension 67 are of generally teardrop shape (which is approximately the configuration of the opening of the previously described embodiment) but there is no continuation of the deformed portions 58 covering the opening. Note that notwithstanding the bottom portion of the grooves 60 may be cut away, there is still a corner 71 formed to give rise to the snap-in seating of the T 43, and its locking in position.

It is believed that the hose clamp structure comprising the invention, and all of its ramifications should be sufficiently understood by those skilled in this art, without the necessity for further explanation. Variations of the structure in a device of this kind are capable of readily being made in many ways—as to form and arrangement and proportion and dimension, but without departing in any way from the spirit of the invention or the scope as defined in the appended claims.

What it is desired to secure by Letters Patent of the United States is:

1. A hose clamp of the quick release type comprising a tension band having free ends, a journal formation pivotally mounting a T-bolt on one end with the T portion of the bolt extending to the other end, a pair of ears on the other end having portions spaced apart a distance less than the width of the T providing a seat for said T in edge-on engagement with said portions, and means for guiding said T to the portions in a movement toward the said one end, said guiding means comprising an outwardly curved deformation in each ear aligned one with the other and defining therebetween a passageway to the portions, the passageway being wider than the space between the said portions of the ears.

2. A hose clamp of the quick release type comprising a tension band having free ends, a journal formation pivotally mounting a T-bolt on one end with the T portion of the bolt extending to the other end, a pair of ears on the other end having portions spaced apart a distance less than the width of the T, providing a seat for said T in edge-on engagement with said portions, and means for guiding said T to the portions in a movement toward the said one end, said guiding means comprising an outwardly curved deformation in each ear aligned one with the other and defining therebetween a passageway to the portions, the passageway being wider than the space between the said portions of the ears, said deformations each being sheared away from the ears adjacent the lower end of the passageway to provide a pair of tracks extending substantially parallel to said band thereat.

3. A hose clamp of the quick release type comprising a tension band having free ends, a journal formation pivotally mounting a T-bolt on one end with the T portion of the bolt extending to the other end, a pair of ears on the other end having portions spaced apart a distance less than the width of the T providing a seat for said T in edge-on engagement with said portions, and means for guiding said T to the seating means in a movement toward the said one end, said guiding means comprising an outwardly curved deformation in each ear aligned one with the other and defining therebetween a passageway to the portions, the passageway being wider than the space between the said portions of the ears, said deformations each being sheared away from the ears adjacent the lower end of the passageway to provide a pair of tracks extending substantially parallel to said band thereat, said deformations each having a portion thereof disposed outside of an end of said T when seated.

4. A hose clamp of the quick release type comprising a tension band having free ends, a journal formation pivotally mounting a T-bolt on one end with the T portion of the bolt extending to the other end, a pair of ears on the other end having portions spaced apart a distance less than the width of the T providing a seat for said T in edge-on engagement with said portions, and means for guiding said T to the seating means in a movement toward the said one end, said guiding means comprising an outwardly curved deformation in each ear aligned one with the other and defining therebetween a passageway to the portions, the passageway being wider than the space between the said portions of the ears, said deformations each being sheared away from the ears adjacent the lower end of the passageway to provide a pair of tracks extending substantially parallel to said band thereat, said deformations each having an opening of generally teardrop shape adjacent each end of the T so seated.

5. A hose clamp of the quick release type comprising a tension band having free ends, a journal formation on one end, a T bolt pivotally mounted for free swinging in the journal with the T portion of the bolt extending to the second free end, a coupler member mounted on the second free end including a base, a pair of laterally spaced ears upstanding on the base each having a continuous peripheral edge, at least the forward portions of said ears being spaced apart less than the length of said T to provide a seat for the T thereat, and means for guiding said T to said seat in a movement from the peripheral edges of the ears toward said seat with the ends of the T portion passing inwardly of the ears.

6. A hose clamp as described in claim 5 in which said means are constructed to provide a restricted path for said movement generally radially inward of the axis of the hose clamp.

7. A hose clamp as described in claim 5 in which said base is curved approximating the curvature of the band, said ears each having a shoulder formed thereon between said seat and guide means above the base preventing free movement of the T in a direction away from the seat along the guide means.

8. A hose clamp as described in claim 5 in which the seat comprises recesses spaced above the bottom edges of said ears.

9. A hose clamp as described in claim 5 in which the seat comprises recesses in said ears, and said guiding means comprise a pair of opposite aligned grooves formed in said ears each having an entrance thereto at a peripheral edge rearward and radially outward of said respective recesses and said grooves being connected with said respective recesses.

10. A hose clamp of the quick release type comprising a tension band having free ends, one end having a journal formation thereon, and pivotally mounting a T bolt, the second end having coupling means for engaging the T end of the T bolt so that the free ends are pulled together as the T bolt is pulled, said coupling means including a base portion secured on the second end having pair of fixed upstanding ears arranged in substantially parallel planes perpendicular to the axis of said clamp, said ears each including a continuous connected peripheral portion at least the forward and top parts of which are spaced apart less than the length of the T, seating means formed between the ears in the center thereof such that when said T is seated said top and forward parts of said peripheral portions will oppose relative movement between said T and ears while subjecting said clamp to tension, and an entrance to said seating means formed at the rear of said ears for guiding the said T to said seating means.

References Cited in the file of this patent

UNITED STATES PATENTS

| 2,368,929 | King | Feb. 6, 1945 |

FOREIGN PATENTS

| 526,654 | France | July 6, 1921 |
| 704,299 | France | Feb. 17, 1931 |